United States Patent
Xu et al.

(10) Patent No.: US 12,022,517 B2
(45) Date of Patent: Jun. 25, 2024

(54) NON-SCHEDULING RESOURCE BASED DATA SENDING METHOD AND APPARATUS THEREOF

(71) Applicant: Huawei Technologies Co., Ltd., Shenzhen (CN)

(72) Inventors: Xiaoying Xu, Shanghai (CN); Qufang Huang, Shanghai (CN); Qinghai Zeng, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 85 days.

(21) Appl. No.: 16/674,778

(22) Filed: Nov. 5, 2019

(65) Prior Publication Data

US 2020/0068624 A1 Feb. 27, 2020

Related U.S. Application Data

(63) Continuation of application No. PCT/CN2018/085420, filed on May 5, 2018.

(30) Foreign Application Priority Data

May 5, 2017 (CN) .................. 201710314144.8

(51) Int. Cl.
*H04W 74/08* (2009.01)
*H04W 24/08* (2009.01)
(Continued)

(52) U.S. Cl.
CPC ..... *H04W 74/0833* (2013.01); *H04W 74/006* (2013.01)

(58) Field of Classification Search
None
See application file for complete search history.

(56) References Cited

U.S. PATENT DOCUMENTS

| 8,374,621 | B2* | 2/2013 | Maheshwari | ......... H04W 72/20 |
| | | | | 455/452.2 |
| 2004/0032851 | A1* | 2/2004 | Wu | .............. H04L 67/04 |
| | | | | 370/346 |

(Continued)

FOREIGN PATENT DOCUMENTS

| CN | 101106439 A | 1/2008 |
| CN | 101137098 A | 3/2008 |

(Continued)

OTHER PUBLICATIONS

"UL grant-free transmission," 3GPP TSG-RAN WG2 Meeting #97bis, Spokane, USA, R2-1702514, Total 3 pages, 3rd Generation Partnership Project, Valbonne, France (Apr. 3-7, 2017).

(Continued)

*Primary Examiner* — Jenee Holland
(74) *Attorney, Agent, or Firm* — Leydig, Voit & Mayer, Ltd.

(57) ABSTRACT

A data sending method includes: receiving, by a terminal device, configuration information sent by a network device, where the configuration information is used to configure a non-scheduling resource; and starting, by the terminal device when a condition is met, a first timer, where the non-scheduling resource is not used for sending uplink data within duration of the first timer. According to the method, a timer is set on the terminal device, and the timer is used to instruct the terminal device whether to send data on a non-scheduling resource. Therefore, a data sending success rate and a communication latency of the terminal device can be effectively balanced.

22 Claims, 4 Drawing Sheets

(51) Int. Cl.
*H04W 28/02* (2009.01)
*H04W 28/10* (2009.01)
*H04W 72/04* (2023.01)
*H04W 72/12* (2023.01)
*H04W 72/23* (2023.01)
*H04W 74/00* (2009.01)
*H04W 74/0833* (2024.01)

(56) References Cited

U.S. PATENT DOCUMENTS

| | | | | |
|---|---|---|---|---|
| 2006/0268798 | A1* | 11/2006 | Kim | H04W 72/20 370/338 |
| 2007/0064602 | A1* | 3/2007 | Jiang | H04L 1/187 370/229 |
| 2008/0117891 | A1* | 5/2008 | Damnjanovic | H04W 72/04 370/345 |
| 2009/0054006 | A1* | 2/2009 | Cai | H04L 5/0053 455/73 |
| 2009/0149189 | A1* | 6/2009 | Sammour | H04L 1/165 455/450 |
| 2009/0268683 | A1* | 10/2009 | Ho | H04L 1/1628 370/329 |
| 2009/0268693 | A1* | 10/2009 | Lindh | H04W 72/042 370/336 |
| 2009/0298524 | A1* | 12/2009 | Kuo | H04W 56/0045 455/509 |
| 2010/0054203 | A1* | 3/2010 | Damnjanovic | H04L 1/0027 370/344 |
| 2010/0080185 | A1* | 4/2010 | Guo | H04L 47/10 370/329 |
| 2010/0085927 | A1* | 4/2010 | Torsner | H04L 1/1822 370/329 |
| 2010/0115355 | A1* | 5/2010 | Hsu | H04W 72/1284 714/726 |
| 2010/0118807 | A1* | 5/2010 | Seo | H04L 5/0085 370/329 |
| 2010/0120442 | A1* | 5/2010 | Zhuang | H04B 7/15507 455/450 |
| 2010/0177721 | A1* | 7/2010 | Simonsson | H04W 72/1284 455/452.2 |
| 2010/0202302 | A1* | 8/2010 | Cai | H04L 1/1825 370/252 |
| 2010/0322098 | A1* | 12/2010 | Pelletier | H04W 72/1252 370/252 |
| 2011/0321050 | A1* | 12/2011 | Ho | H04W 4/08 718/102 |
| 2012/0039263 | A1* | 2/2012 | Moberg | H04W 72/1284 370/329 |
| 2012/0100864 | A1* | 4/2012 | Susitaival | H04W 72/0446 455/450 |
| 2012/0155413 | A1* | 6/2012 | Liu | H04L 5/0055 370/329 |
| 2012/0230291 | A1* | 9/2012 | Han | H04L 1/0006 370/329 |
| 2013/0039347 | A1* | 2/2013 | Moqvist | H04L 1/1822 370/335 |
| 2013/0058233 | A1* | 3/2013 | Kim | H04W 24/08 370/252 |
| 2013/0235768 | A1* | 9/2013 | Earnshaw | H04B 1/56 370/280 |
| 2013/0242833 | A1* | 9/2013 | Ahn | H04W 72/0453 370/311 |
| 2013/0294247 | A1* | 11/2013 | Zhu | H04W 72/0486 370/235 |
| 2013/0315142 | A1* | 11/2013 | Gao | H04W 72/1215 370/328 |
| 2013/0322331 | A1* | 12/2013 | Ramkumar | H04W 28/10 370/328 |
| 2013/0336293 | A1* | 12/2013 | Yang | H04W 72/12 370/336 |
| 2013/0343356 | A1* | 12/2013 | Bai | H04W 72/0446 370/336 |
| 2014/0050170 | A1* | 2/2014 | Xu | H04W 76/27 370/329 |
| 2014/0146796 | A1* | 5/2014 | Yang | H04W 72/21 370/336 |
| 2014/0321272 | A1* | 10/2014 | Bangolae | H04L 65/80 370/230 |
| 2014/0328306 | A1* | 11/2014 | Gao | H04W 16/14 370/329 |
| 2015/0124775 | A1* | 5/2015 | Guo | H04W 8/005 370/329 |
| 2015/0131631 | A1* | 5/2015 | Chen | H04W 24/02 370/336 |
| 2015/0195753 | A1* | 7/2015 | Jung | H04W 36/0055 370/331 |
| 2015/0257144 | A1* | 9/2015 | Hooli | H04W 72/0406 370/329 |
| 2015/0382283 | A1* | 12/2015 | Wang | H04W 52/0216 370/328 |
| 2016/0021646 | A1 | 1/2016 | Hu et al. | |
| 2016/0057785 | A1* | 2/2016 | Zhang | H04W 72/23 370/329 |
| 2016/0073265 | A1 | 3/2016 | Vutukuri et al. | |
| 2016/0157256 | A1* | 6/2016 | Tseng | H04W 72/21 370/329 |
| 2016/0227517 | A1* | 8/2016 | Han | H04W 72/04 |
| 2016/0241376 | A1* | 8/2016 | Gauvreau | H04W 72/0413 |
| 2016/0309503 | A1* | 10/2016 | Quan | H04W 76/20 |
| 2017/0048880 | A1* | 2/2017 | Anderson | H04W 72/1268 |
| 2017/0055242 | A1* | 2/2017 | Kusashima | H04L 27/2607 |
| 2017/0086174 | A1 | 3/2017 | Zhang | |
| 2017/0104563 | A1* | 4/2017 | Lee | H04W 72/121 |
| 2017/0105179 | A1* | 4/2017 | Kusashima | H04W 52/367 |
| 2017/0238284 | A1* | 8/2017 | Tseng | H04W 72/0453 370/329 |
| 2020/0029206 | A1* | 1/2020 | Zhang | H04W 12/033 |

FOREIGN PATENT DOCUMENTS

| | | |
|---|---|---|
| CN | 101222775 A | 7/2008 |
| CN | 101291173 A | 10/2008 |
| CN | 101355549 A | 1/2009 |
| CN | 101489258 A | 7/2009 |
| CN | 101547481 A | 9/2009 |
| CN | 101854721 A | 10/2010 |
| CN | 101860966 A | 10/2010 |
| CN | 104780544 A | 7/2015 |
| CN | 105451251 A | 3/2016 |
| CN | 105827379 A | 8/2016 |
| JP | H08317463 A | 11/1996 |
| JP | 2017005708 A | 1/2017 |
| KR | 20150106921 A | 9/2015 |
| RU | 2612658 C2 | 3/2017 |
| WO | 2009116939 A2 | 9/2009 |
| WO | 2015089253 A2 | 6/2015 |
| WO | 2016123025 A1 | 8/2016 |

OTHER PUBLICATIONS

"HARQ handling for SPS UL," 3GPP TSG-RAN WG2 #97bis, Spokane, USA, Tdoc R2-1702666, pp. 1-3, 3rd Generation Partnership Project, Valbonne, France (Apr. 3-7, 2017).

"Aspects of grant-free and contention based UL transmission in NR," 3GPP TSG-RAN WG2 #97bis, Spokane, USA, Tdoc R2-1702747, pp. 1-3, 3rd Generation Partnership Project, Valbonne, France (Apr. 3-7, 2017).

"3rd Generation Partnership Project; Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 14)," 3GPP TS 36.523-1 V14.0.1, pp. 1-37, 3rd Generation Partnership Project, Valbonne, France (Mar. 2017).

"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321 V14.2.1, pp. 1-106, 3rd Generation Partnership Project, Valbonne, France (Mar. 2017).

(56) References Cited

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.2.0, pp. 1-330, 3rd Generation Partnership Project, Valbonne, France (Mar. 2017).
"Considerations on grant free transmission for NR," 3GPP TSG-RAN WG2 Meeting #96, Reno, Nevada, USA, R2-168478, pp. 1-2, 3rd Generation Partnership Project, Valbonne, France (Nov. 14-18, 2016).
"Scheduling for URLLC," 3GPP TSG-RAN WG2, Meeting #96, Reno, Nevada, US, R2-168459, pp. 1-5, 3rd Generation Partnership Project, Valbonne, France (Nov. 14-18, 2016).
"UL Grant-free transmission," 3GPP TSG RAN WG1 Meeting #88, Athens, Greece, R1-1701665, pp. 1-15, 3rd Generation Partnership Project, Valbonne, France (Feb. 13-17, 2017).
"Discussion on scheduling enhancement," 3GPP TSG-RAN2 #97bis, Spokane, USA, R2-1702545, pp. 1-4, 3rd Generation Partnership Project, Valbonne, France (Apr. 3-7, 2017).
"Reliability enhancement for grant-free transmission," 3GPP TSG RAN WG1 NR Ad Hoc Meeting, Vancouver, Canada, R1-1800055, pp. 1-6, 3rd Generation Partnership Project, Valbonne, France (Jan. 22-26, 2018).
"HARQ handling for SPS UL," 3GPP TSG-RAN WG2, #97bis, Spokane, USA, R2-1702666, pp. 1-3, 3rd Generation Partnership Project, Valbonne, France (Apr. 3-7, 2017).
"Discussion on type 1 grant-free for connected mode UE," 3GPP TSG-RAN WG2, Meeting #99, Berlin, Germany, R2-1709264, pp. 1-4, 3rd Generation Partnership Project, Valbonne, France (Aug. 21-25, 2017).
"General HARQ aspects of SPS UL," 3GPP TSG-RAN WG2 #99, Berlin, Germany, Tdoc R2-1708352, pp. 1-7, 3rd Generation Partnership Project, Valbonne, France (Aug. 21-25, 2017).
"HARQ and Transmission for Type 1 Grant-Free for Active UE," 3GPP TSG-RAN WG2 Meeting #99bis, Prague, Czech Republic, R2-1711431, pp. 1-5, 3rd Generation Partnership Project, Valbonne, France (Oct. 9-13, 2017).
"Leftovers of HARQ Transmission with Configured Grant Timer," 3GPP TSG-RAN WG2 Meeting AH 1801, Vancouver, Canada, R2-1801032, pp. 1-3, 3rd Generation Partnership Project, Valbonne, France (Jan. 22-26, 2018).
"Summary of [99bis#41] [NR UP/MAC] Open issues on SPS and GF—Huawei," 3GPP TSG RAN WG2 Meeting 100, Reno, United States, R2-1713173, pp. 1-58, 3rd Generation Partnership Project, Valbonne, France (Nov. 27-Dec. 1, 2017).
"UE behavior on configured grant timer upon DCI reception," 3GPP TSG-RAN WG2 NR AH-1801, Vancouver, Canada, R2-1800165, pp. 1-6, 3rd Generation Partnership Project, Valbonne, France (Jan. 26-27, 2018).
"3rd Generation Partnership Project; Technical Specification Group Radio Access Network; NR; Medium Access Control (MAC) protocol specification (Release 15)," 3GPP TS 38.321 V0.0.3, pp. 1-20, 3rd Generation Partnership Project, Valbonne, France (May 2017).
"3rd Generation Partnership Project; Technical Specification Group Radio Access Network; NR; Radio Resource Control (RRC); Protocol specification (Release 15)," 3GPP TS 38.331 V0.0.4, pp. 1-22, 3rd Generation Partnership Project, Valbonne, France (Jun. 2017).
"On Intra-UE UL Puncturing," 3GPP TSG-RAN WG1 #88bis, Spokane, USA, R1-1706056, Total 2 pages, 3rd Generation Partnership Project, Valbonne, France (Apr. 3-7, 2017).
"Discussion on grant-based and grant-free UL transmissions for latency reduction," 3GPP TSG RAN WG1 Meeting #88, Athens, Greece, R1-1702490, Total 9 pages, 3rd Generation Partnership Project, Valbonne, France (Feb. 13-17, 2017).
JP/2021-199337, Notice of Allowance, dated Oct. 24, 2022.
CN/201710314144.8, Office Action and Search Report, dated Feb. 7, 2023.
Yamindi et al., "The Approach of the New Downlink Control Information Design for Transmission Mode 10," Wireless Telecommunications Symposium (WTS), Total 7 pages, Institute of Electrical and Electronics Engineers, New York, New York (Jul. 25, 2013).
Chen Tingting, "The Research on Detection Algorithm on Downlink Control Channel in Lte," Beijing University of Posts and Telecommunications, Total 1 page (2013).
CN/201710314144, Office Action, dated Jun. 30, 2023.
"Consideration on MAC configuration for unlicensed spectrum," 3GPP TSG-RAN WG2 Meeting #89bis, Bratislava, Slovakia, R2-151652, pp. 1-3, 3rd Generation Partnership Project, Valbonne, France (Apr. 20-24, 2015).
RU/2019138459, Office Action, Sep. 10, 2021.

* cited by examiner

NON-SCHEDULING RESOURCE BASED DATA SENDING METHOD AND APPARATUS THEREOF

CROSS-REFERENCE TO RELATED APPLICATIONS

This application is a continuation of International Application No. PCT/CN2018/085420, filed on May 3, 2018, which claims priority to Chinese Patent Application No. 201710314144.8, filed on May 5, 2017. The disclosures of the aforementioned applications are hereby incorporated by reference in their entireties

TECHNICAL FIELD

This application relates to the communications field, and more specifically, to a data sending method and an apparatus thereof.

BACKGROUND

In a method for rapidly sending data, a non-scheduling resource is used by a terminal device to send uplink data. This is because the terminal device does not need to wait for a time to request a scheduling resource from a network device. Generally, the terminal device determines an uplink sending resource according to a broadcast message or dedicated signaling, and sends data on the uplink resource.

For a non-scheduling resource, if data of only one terminal device is sent on the non-scheduling resource, a data sending success rate of the terminal device is relatively high, and a data sending latency is relatively low. However, if data of a plurality of terminal devices needs to be sent by using the non-scheduling resource at the same time, there may be a data sending conflict, and a data sending success rate is relatively low.

Therefore, there is an urgent need for a data sending method that can balance a data sending success rate and a communication latency.

SUMMARY

This application provides a data sending method, to balance a data sending success rate and a communication latency.

According to a first aspect, a data sending method is provided, and includes: receiving, by a terminal device, configuration information sent by a network device, where the configuration information is used to configure a non-scheduling resource; starting, and by the terminal device, a first timer, where the non-scheduling resource is not used for sending uplink data within duration of the first timer, when any one of the following conditions is met: the terminal device sends uplink data on the non-scheduling resource; the terminal device receives grant resource indication information sent by the network device; the terminal device receives grant resource indication information sent by the network device, and sends uplink data on a grant resource indicated by the grant resource indication information; the terminal device receives a dedicated preamble sequence index sent by the network device; the terminal device receives a dedicated preamble sequence index sent by the network device, and sends a dedicated preamble sequence to the network device based on the preamble sequence index; and the terminal device requests a grant resource from the network device.

According to the method provided in this embodiment of this application, a timer is set on the terminal device, and the timer is used to instruct the terminal device whether to send data on a non-scheduling resource. Therefore, a data sending success rate and a communication latency of the terminal device can be effectively balanced.

With reference to the first aspect, in a first possible implementation of the first aspect, that the terminal device requests a grant resource from the network device includes: The terminal device sends a buffer state report (BSR) to the network device. Alternatively, the terminal device sends a BSR to the network device, and receives a correct-receive response of the BSR.

With reference to the first aspect, in a second possible implementation of the first aspect, the grant resource indicated by the grant resource indication information is a resource that is requested by the terminal device for sending uplink data.

With reference to the first aspect, in a third possible implementation of the first aspect, the method further includes: receiving, by the terminal device, a non-scheduling resource indication sent by the network device; and determining, according to the non-scheduling resource indication, that the terminal device sends uplink data by using the non-scheduling resource, and stopping the first timer.

According to a second aspect, a data sending method is provided, and includes: receiving, by a terminal device, configuration information sent by a network device, where the configuration information is used to configure a non-scheduling resource; and starting, by the terminal device, a second timer, where the non-scheduling resource is not used for sending uplink data within duration of the second timer, when any one of the following conditions is met: a volume of first to-be-sent data of the terminal device is less than a first threshold; a priority of a service of the first to-be-sent data is lower than a preset priority; and a logical channel on which the first to-be-sent data is located is a channel in a preset logical channel set.

In this way, the timer is used to control frequency at which the terminal device sends data by using a non-scheduling resource. This prevents the terminal device from frequently sending small data by using the resource, improves resource usage efficiency, and reduces a probability of conflict on a same resource for a plurality of terminal devices.

With reference to the second aspect, in a first possible implementation of the second aspect, the method further includes: stopping, by the terminal device, the second timer when the second timer has not expired and a volume of second to-be-sent data of the terminal device exceeds a second threshold; and sending, by the terminal device, the second to-be-sent data by using the non-scheduling resource; or sending, by the terminal device when the second timer expires, the first to-be-sent data by using the non-scheduling resource.

In other words, after the second timer expires, the non-scheduling resource may be used to send the first to-be-sent data. In this way, a user equipment (UE) can be prevented from frequently occupying a shared non-scheduling resource, and a plurality of small packets can be aggregated for sending at a time, thereby improving resource usage efficiency.

According to a third aspect, a data sending method is provided, and includes: obtaining, by a terminal device, a parameter set; determining, by the terminal device, a target parameter in the parameter set based on at least one of a service type and a sending mode of to-be-sent data; and starting, by the terminal device, a third timer based on the target parameter, where a non-scheduling resource is not used by the terminal device for sending the to-be-sent data within duration of the third timer.

In this way, the parameter is used to control the terminal device to distinguish between different preferentially sent services or modes, thereby ensuring that more sending opportunities can be obtained for a high-priority service or some specific sending modes.

With reference to the third aspect, in a first possible implementation of the third aspect, a higher priority of the service type of the to-be-sent data indicates a larger parameter and a lower probability that the third timer is started.

It should be understood that the obtaining, by a terminal device, a parameter set includes: receiving a parameter set sent by a network device.

According to a fourth aspect, a network device is provided, and configured to send the foregoing parameter set to a terminal device. Specifically, the network device may include a module configured to perform a corresponding step of the network device, for example, a processing module, a sending module, or a receiving module.

According to a fifth aspect, a terminal device is provided, and applied to the foregoing method for a terminal device. Specifically, the terminal device may include a module configured to perform a corresponding step of the terminal device, for example, a processing module, a sending module, or a receiving module.

According to a sixth aspect, a network device is provided, and includes a memory and a processor. The memory is configured to store a computer program. The processor is configured to invoke the computer program from the memory and run the computer program, so that the network device performs the foregoing method for a network device.

According to a seventh aspect, a terminal device is provided, and includes a memory and a processor. The memory is configured to store a computer program. The processor is configured to invoke the computer program from the memory and run the computer program, so that the terminal device performs the foregoing method for a terminal device.

According to an eighth aspect, a computer-readable storage medium is provided, where the computer-readable storage medium stores an instruction, and when the instruction is run on a computer, the computer performs the method according to the foregoing aspects.

According to a ninth aspect, a computer program product that includes an instruction is provided. When the computer program product is run on a computer, the computer performs the method according to the foregoing aspects.

DESCRIPTION OF EMBODIMENTS

Figure 1:
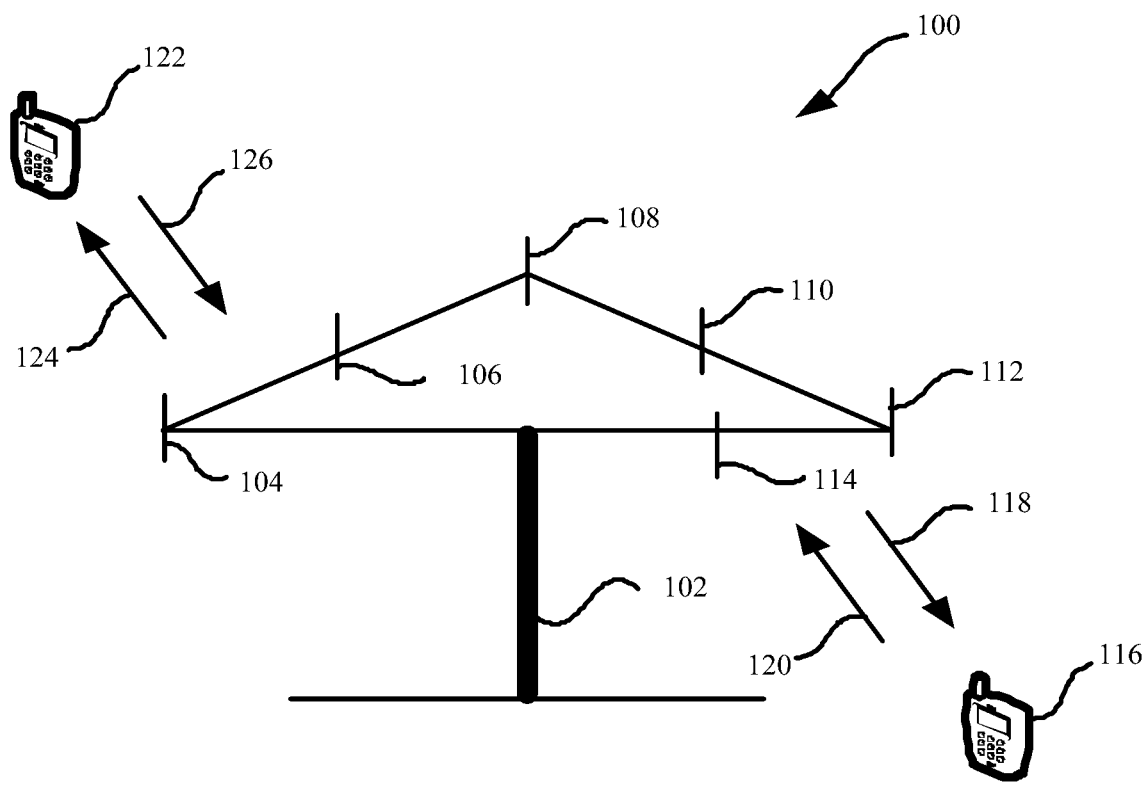
FIG. 1 is a schematic diagram of a wireless communications system applied to an embodiment of this application.

The following describes technical solutions of this application with reference to the accompanying drawings.

It should be understood that embodiments of this application may be applied to various communications systems, for example, a global system for mobile communications (GSM), a code division multiple access (CDMA) system, a wideband code division multiple access (WCDMA) system, general packet radio service (GPRS), a long term evolution (LTE) system, a long term evolution advanced (LTE-A) system, or a universal mobile telecommunications system (UMTS), and a next-generation communications system, such as a 5G system.

Generally, a conventional communications system supports a limited quantity of connections and is easy to implement. However, with development of communications technologies, a mobile communications system not only supports conventional communication, but also supports, for example, device-to-device (D2D) communication, machine-to-machine (M2M) communication, machine type communication (MTC), and vehicle-to-vehicle (V2V) communication.

Embodiments of this application are described with reference to a sending device and a receiving device. The sending device may be one of a network device and a terminal device, and the receiving device may be the other one of the network device and the terminal device. For example, in embodiments of this application, the sending device may be the network device, and the receiving device may be the terminal device; or the sending device may be the terminal device, and the receiving device may be the network device.

The terminal device may also be referred to as a user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (STA) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a computing device or another processing device connected to a wireless modem, an in-vehicle device, a wearable device, a terminal device in a next-generation communications system, for example, a fifth-generation (5G) communications network, or a terminal device in a future evolved public land mobile network (PLMN).

For example, in embodiments of this application, the terminal device may alternatively be a wearable device. The wearable device may also be referred to as a wearable intelligent device, and is a general term of wearable devices, such as glasses, gloves, watches, clothes, and shoes, that are developed by applying wearable technologies in intelligent designs of daily wear. The wearable device is a portable device that can be directly worn on a body or integrated into clothes or an accessory of a user. The wearable device is not merely a hardware device, but is used to implement a powerful function through software support, data interaction, and cloud interaction. Generalized wearable intelligent devices include full-featured and large-size devices that can implement complete or partial functions without depending on smart phones, for example, smart watches or smart glasses, and include devices that focus on only one type of application and need to work with other devices such as smart phones, for example, various smart bands or smart jewelry for vital sign monitoring.

The network device may be a device configured to communicate with a mobile device. The network device may be an access point (AP) in a WLAN, or a base station (Base Transceiver Station, BTS) in GSM or CDMA, or may be a base station (e.g., a NodeB (NB)) in WCDMA; or may be a base station (e.g., an evolved Node B (eNB or eNodeB)) in LTE, a relay station, an access point, an in-vehicle device, a wearable device, a network device in a future 5G network, a network device in a future evolved PLMN network, or the like.

In addition, in embodiments of this application, the network device provides a service for a cell, and the terminal device communicates with the network device by using a transmission resource (for example, a frequency domain resource, or a spectrum resource) used by the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, or the like. These small cells have features of small coverage and low transmit power, and are applicable to providing a high-speed data transmission service.

A method and an apparatus provided in embodiments of this application may be applied to a terminal device or a network device. The terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, such as the Linux operating system, the Unix operating system, the Android operating system, the iOS operating system, or the Windows operating system. The application layer includes applications such as a browser, an address book, text processing software, and instant messaging software. In addition, in embodiments of this application, a specific structure of an entity for performing a signal transmission method is not specially limited, provided that the entity can run program recording code of a signal transmission method in embodiments of this application, to perform communication based on a signal transmission method in embodiments of this application. For example, a wireless communication method in embodiments of this application may be performed by a terminal device or a network device, or a function module that is in a terminal device or a network device and that can invoke a program and execute the program.

In addition, aspects or features in embodiments of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage device (for example, a hard disk, a floppy disk, or a magnetic tape), an optical disc (for example, a compact disc (CD)), a digital versatile disc (DVD)), a smart card, or a flash storage device (for example, an erasable programmable read-only memory (EPROM)), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

FIG. 1 is a schematic diagram of a wireless communications system applied to an embodiment of this application. As shown in FIG. 1, the wireless communications system 100 includes a network device 102, and the network device 102 may include one or more antennas, for example, antennas 104, 106, 108, 110, 112, and 114. In addition, the network device 102 may additionally include a transmitter chain and a receiver chain. A person of ordinary skill in the art may understand that both the transmitter chain and the receiver chain may include a plurality of components (such as a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that the network device 102 may communicate with any quantity of terminal devices similar to the terminal device 116 or the terminal device 122. The terminal devices 116 and 122 may be, for example, a cellular phone, a smartphone, a portable computer, a handheld communications device, a handheld computing device, a satellite radio apparatus, a global positioning system, a PDA, and/or any other suitable devices used for communication in the wireless communications system 100.

As shown in FIG. 1, the terminal device 116 communicates with the antennas 112 and 114. The antennas 112 and 114 send information to the terminal device 116 by using a forward link (also referred to as a downlink) 118, and receive information from the terminal device 116 by using a reverse link (also referred to as an uplink) 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 and the reverse link 120 may use different frequency bands, and the forward link 124 and the reverse link 126 may use different frequency bands.

For another example, in a time division duplex (TDD) system, a full duplex system, and a flexible duplex system, the forward link 118 and the reverse link 120 may share a frequency band, and the forward link 124 and the reverse link 126 may share a frequency band.

Each antenna (or an antenna group including a plurality of antennas) and/or an area designed for communication are/is referred to as a sector of the network device 102. For example, an antenna group may be designed to communicate with a terminal device in the sector within coverage of the network device 102. The network device may send, by using a single antenna or a plurality of antenna transmit diversities, a signal to all terminal devices in a sector corresponding to the network device. In a process in which the network device 102 communicates with the terminal devices 116 and 122 respectively by using the forward links 118 and 124, a transmit antenna of the network device 102 may improve signal-to-noise ratios of the forward links 118 and 124 through beamforming. In addition, compared with a manner in which the network device sends a signal to all terminal devices served by the network device by using a single antenna or a plurality of antenna transmit diversities, when the network device 102 sends, through beamforming, a signal to the terminal devices 116 and 122 that are randomly distributed within related coverage, less interference is caused to a mobile device in a neighboring cell.

Within a given time, the network device 102, the terminal device 116 or the terminal device 122 may be a sending apparatus for wireless communication and/or a receiving apparatus for wireless communication. When sending data, the sending apparatus for wireless communication may encode the data for transmission. Specifically, the sending apparatus for wireless communication may obtain (for example, generate, receive from another communications apparatus, or store in a memory) a particular quantity of data bits to be sent, by using a channel, to the receiving apparatus for wireless communication. The data bit may be included in a transport block (or a plurality of transport blocks) of the data, and the transport block may be segmented to produce a plurality of code blocks.

In addition, the communications system 100 may be a PLMN network, a D2D network, an M2M network, or another network. FIG. 1 is only an example of a simplified schematic diagram. The network may further include another network device that is not drawn in FIG. 1.

Figure 2:
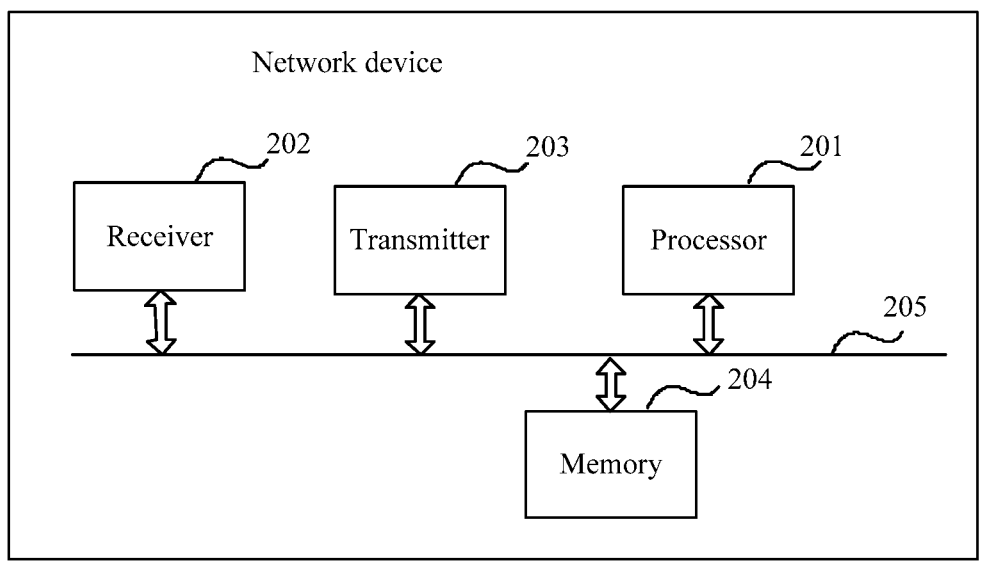
FIG. 2 is a schematic structural diagram of a network device in the foregoing wireless communications system.

FIG. 2 is a schematic structural diagram of a network device in the foregoing wireless communications system. The network device can perform a data sending method provided in embodiments of this application. The network device includes a processor 201, a receiver 202, a transmitter 203, and a memory 204. The processor 201 may be in communication connection with the receiver 202 and the transmitter 203. The memory 204 may be configured to store program code and data of the network device. Therefore, the memory 204 may be an internal storage unit of the processor 201, or may be an external storage unit separate from the processor 201, or may be a component that includes an internal storage unit of the processor 201 and an external storage unit separate from the processor 201.

Optionally, the network device may further include a bus 205. The receiver 202, the transmitter 203, and the memory 204 may be connected to the processor 201 through the bus 205. The bus 205 may be a peripheral component interconnect (PCI) bus, an extended industry standard architecture (EISA) bus, or the like. The bus 205 may be classified into an address bus, a data bus, a control bus, and the like. For ease of representation, only one thick line is used to represent the bus in FIG. 2, but this does not mean that there is only one bus or only one type of bus.

The processor 201, for example, may be a central processing unit (CPU), a general-purpose processor, a digital signal processor (DSP), an application-specific integrated circuit (ASIC), a field programmable gate array (FPGA), or another programmable logical component, a transistor logical component, a hardware component, or a combination thereof. The processor 201 may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The receiver 202 and the transmitter 203 may be circuits including the foregoing antenna, transmitter chain, and receiver chain, may be separate circuits, or may be a same circuit.

Figure 3:
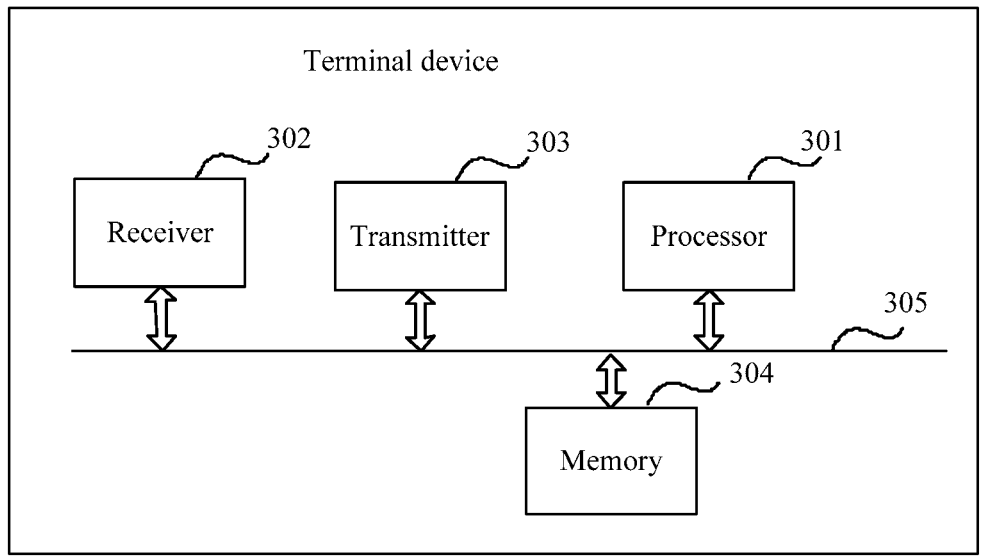
FIG. 3 is a schematic structural diagram of a terminal device in the foregoing wireless communications system.

FIG. 3 is a schematic structural diagram of a terminal device in the foregoing wireless communications system. The terminal device can perform a data receiving method provided in embodiments of this application. The terminal device may include a processor 301, a receiver 302, a transmitter 303, and a memory 304. Optionally, the processor 301 may be in communication connection with the receiver 302 and the transmitter 303. Alternatively, the terminal device may further include a bus 305. The receiver 302, the transmitter 303, and the memory 304 may be connected to the processor 301 through the bus 305. The bus 305 may be a peripheral component interconnect (PCI) bus, an extended industry standard architecture (EISA) bus, or the like. The bus 305 may be classified into an address bus, a data bus, a control bus, and the like. For ease of representation, only one thick line is used to represent the bus in FIG. 3, but this does not mean that there is only one bus or only one type of bus.

Correspondingly, the memory 304 may be configured to store program code and data of the terminal device. Therefore, the memory 304 may be an internal storage unit of the processor 301, or may be an external storage unit separate from the processor 301, or may be a component that includes an internal storage unit of the processor 301 and an external storage unit separate from the processor 301. The receiver 302 and the transmitter 303 may be separate circuits, or may be a same circuit.

In the prior art, the terminal device determines a non-scheduling resource according to a broadcast message, and sends uplink data on the non-scheduling resource, or the terminal device determines, according to dedicated signaling or prescheduling signaling, a non-scheduling resource pre-configured by the network device, and sends data on the non-scheduling resource.

In the prior art, when the terminal device sends data by using the non-scheduling resource, the terminal device usually uses a default timing advance (TA) value, or a TA value used by the terminal device to send data last time.

According to a method provided in embodiments of this application, a timer is set on the terminal device, and the timer is used to instruct the terminal device whether to send data on a non-scheduling resource. Therefore, a data sending success rate and a communication latency of the terminal device can be effectively balanced.

It should be understood that, in embodiments of this application, the non-scheduling resource is a periodic resource pre-allocated by a network to a UE, and is allocated by using dedicated higher layer signaling or common higher layer signaling or through prescheduling. Information about the foregoing resource includes at least one of the following information: a periodic usage period of the time-frequency resource, a modulation and coding scheme, a quantity of continuous and repeated usage times within one period, a retransmission redundancy version, hybrid automatic repeat request (HARQ) information, and a radio network temporary identifier (RNTI) for allocating the resource. The HARQ information includes a quantity of HARQ processes or an identifier of at least one process. When a plurality of terminals need to send data on the non-scheduling resource, the non-scheduling resource is a contention resource. The non-scheduling resource includes a time domain resource and a frequency domain resource.

It should be understood that, the timer mentioned in embodiments of this application may be implemented in a form of software on the terminal device, or may be integrated as a separate hardware device into the terminal device. This is not limited in this application.

Figure 4:
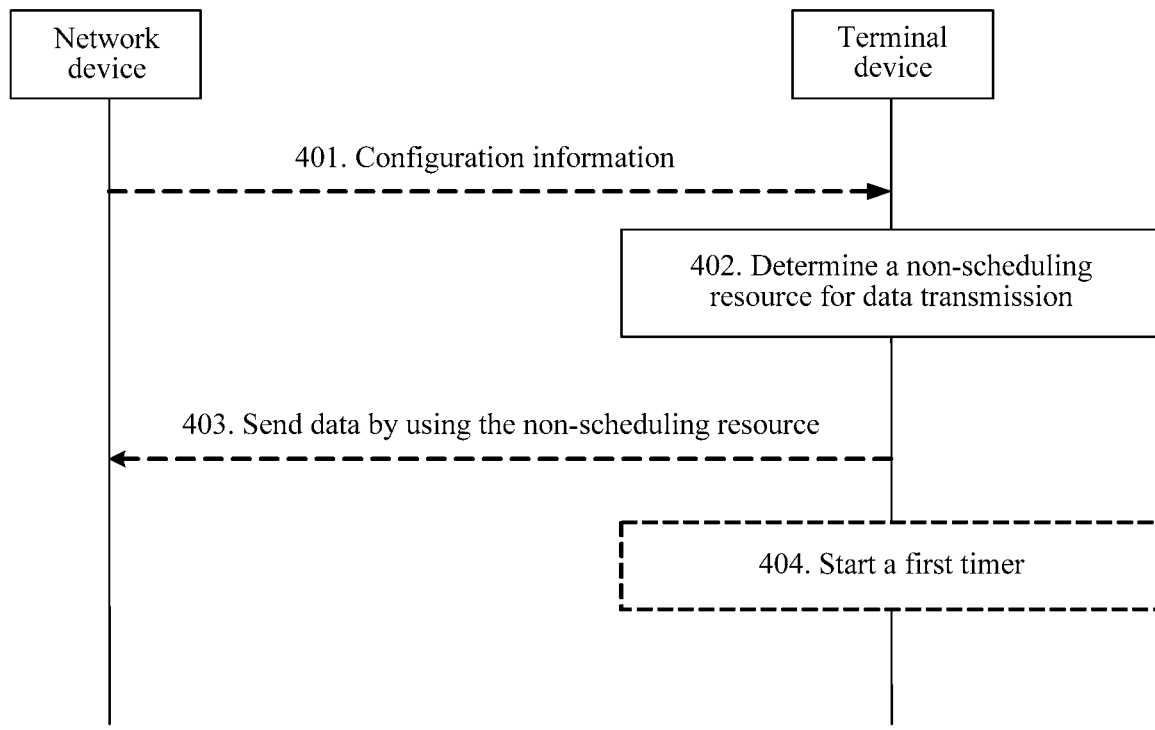
FIG. 4 is a schematic flowchart of a method according to an embodiment of this application.

FIG. 4 is a schematic flowchart of a method according to an embodiment of this application. It should be noted that, dashed lines in FIG. 4 indicate that corresponding steps are optional steps. It should be understood that, these steps or operations are merely examples. Other operations or variants of operations in FIG. 4 may alternatively be performed in this embodiment of this application. In addition, the steps in FIG. 4 may be performed in an order different from that presented in FIG. 4, and the operations in FIG. 4 may not necessarily be all performed. It should be further understood that, in this embodiment of this application, "first", "second", and "third" are merely used to distinguish between different objects, for example, distinguish between different timers, different time-frequency resources, or different data, and should not constitute any limitation on this application.

The method shown in FIG. 4 includes the following steps.

Optionally: Step 401. A network device sends configuration information to a terminal device, where the configuration information is used to schedule a non-scheduling resource.

Specifically, the configuration information may be a broadcast message, or may be a dedicated message, for example, may be a radio resource control configuration message. Partial information of a transmission resource may be pre-allocated by using a physical layer control signaling, for example, a time-frequency resource block. The configuration information may be used to indicate the non-scheduling resource explicitly or implicitly. Further, the configuration information is further used to indicate a modulation and coding scheme for data transmission, a periodic usage period of a non-scheduling transmission resource, or the like. This is not limited in this application.

It should be understood that, for the network device, the network device can determine, based on a scheduling and non-scheduling resource usage ratio or a congestion level, whether to stop using the non-scheduling resource.

When the network device determines that the terminal device can use a non-scheduling resource, the network device sends configuration information related to the non-scheduling resource to the terminal device.

Step 402. The terminal device receives the configuration information sent by the network device, and determines a non-scheduling resource for data transmission based on the configuration information.

Specifically, the configuration information may explicitly or implicitly indicate the non-scheduling resource for data transmission.

Step 404. The terminal device starts a first timer, where the non-scheduling resource is not used for sending data within duration of the first timer, when any one of the following conditions is met:
  the terminal device sends uplink data on the non-scheduling resource;
  the terminal device receives grant resource indication information sent by the network device;
  the terminal device receives grant resource indication information sent by the network device, and sends uplink data on a grant resource indicated by the grant resource indication information;
  the terminal device receives a dedicated preamble sequence index sent by the network device;
  the terminal device receives a dedicated preamble sequence index sent by the network device, and sends a dedicated preamble sequence to the network device based on the preamble sequence index; and
  the terminal device requests a grant resource from the network device.

Specifically, the duration of the first timer may be preset in a protocol standard, or may be preconfigured by the network device by using indication information, or may be duration randomly generated by the terminal device. For example, the duration of the first timer is 100 ms. This is not limited in this application.

In a first case, when the terminal device sends data by using the non-scheduling resource, corresponding to step 403 in FIG. 4, the terminal device starts the first timer. In this case, the duration of the first timer may be set to be greater than or equal to duration from a moment at which the terminal device sends the data to a moment at which feedback information of the sent data is received. When the first timer is started, the terminal device stops using the non-scheduling resource to send data. Specifically, the timer may be set to an expected minimum wait time before downlink HARQ retransmission (e.g. Hybrid Automatic Repeat Request Round Trip Timer, HARQ RTT Timer) of a media access control (MAC) layer, or a timer whose duration is greater than or equal to that of a HARQ RTT timer.

In a second case, when the terminal device receives grant resource indication information sent by the network device, the terminal device starts the first timer. In this case, the duration of the first timer may be set to be greater than or equal to duration from a moment at which the terminal device receives the grant resource indication information to a moment at which feedback information of data that is sent by using a grant resource is received. When the first timer is started, the terminal device stops using the non-scheduling resource to send data.

In a third case, when the terminal device receives grant resource indication information sent by the network device, and sends uplink data on a grant resource indicated by the grant resource indication information, the terminal device starts the first timer. In this case, the duration of the first timer may be set to be greater than or equal to duration from a moment at which the terminal device sends data by using the grant resource to a moment at which feedback information of the data is received. When the first timer is started, the terminal device stops using the non-scheduling resource to send data.

In a fourth case, when the terminal device receives a dedicated preamble sequence index sent by the network device, the terminal device starts the first timer. In this case, the duration of the first timer may be set to be greater than or equal to duration from a moment at which the terminal device sends the dedicated preamble sequence to a moment at which a random access response sent by the network device is received. When the first timer is started, the terminal device stops using the non-scheduling resource to send data.

In a fifth case, when the terminal device receives a dedicated preamble sequence index sent by the network device, and sends a dedicated preamble sequence to the network device based on the preamble sequence index, the terminal device starts the first timer. In this case, the duration of the first timer may be set to be greater than or equal to duration from a moment at which the dedicated preamble sequence is sent to a moment at which a random access response sent by the network device is received. When the first timer is started, the terminal device stops using the non-scheduling resource to send data.

In a sixth case, after requesting a grant resource from the network device, the terminal device starts the first timer.

Optionally, in an embodiment in this case, that the terminal device requests a grant resource from the network device includes: The terminal device sends a buffer state report (BSR) to the network device. Alternatively, the terminal device sends a BSR to the network device, and receives a correct-receive response of the BSR If the first timer is started when the terminal device sends the BSR to the network device, the duration of the first timer may be set to be greater than or equal to duration from a moment at which the terminal device sends the BSR to the network device to a moment at which feedback information of data corresponding to the BSR is received. When the first timer is started, the terminal device stops using the non-scheduling resource to send data.

If the first timer is started when the terminal device sends a BSR to the network device, and receives a correct-receive response of the BSR, the duration of the first timer may be set to be greater than or equal to duration from a moment at which the correct-receive response of the BSR is received to a moment at which feedback information of data corresponding to the BSR is received. When the first timer is started, the terminal device stops using the non-scheduling resource to send data.

It should be understood that, the data corresponding to the BSR is corresponding to-be-sent data when the terminal device has a data transmission need and sends a BSR to the network device to notify the data transmission need. It should be understood that, a response of a resource requested by the BSR may include a resource type for or applicable to the data corresponding to the BSR or a resource type not for or inapplicable to the data corresponding to the BSR. Preferably, the first timer is started when the resource type for or applicable to the BSR is received.

Optionally, in an embodiment in this case, that the terminal device requests a grant resource from the network device includes: The terminal device sends a scheduling request (SR) to the network device. Alternatively, the terminal device sends an SR to the network device, and receives a response of a resource requested by the SR.

It should be understood that, the response of the resource requested by the SR may include a resource type for or applicable to the SR and a resource type not for or inapplicable to the SR. Preferably, the first timer is started when the resource type for or applicable to the SR is received.

After the timer expires, if the terminal device finds that no case meeting the foregoing conditions occurs, the terminal device may send data by using the non-scheduling resource.

Optionally, in an embodiment of this application, the terminal device may send a channel state indicator (which may also be referred to as a Channel Quality Indicator (CQI)) on a physical channel or in a medium access control control element (MAC CE). Specifically, the terminal device may determine, based on at least one of the following conditions, whether to send a CQI of a channel when using the non-scheduling resource: a logical channel used by uplink data, and a data volume of the uplink data. It should be understood that, a specific non-scheduling resource specified in a protocol or preconfigured by a network may alternatively be used to send channel quality information.

For example, when ultra-reliable low latency communication (URLLC) service data is sent by using a non-scheduling resource, a CQI of a channel on which the service data is located may be sent.

It should be understood that, some Internet IP (Internet Protocol) streams, logical channels, or radio bearers may be set to ignore the first timer through pre-configuration. Alternatively, the first timer may be configured for one or more logical channels. For example, the first timer may be separately configured for a data radio bearer (DRB) or a signaling radio bearer (SRB).

Therefore, according to the method provided in this embodiment of this application, a timer is set on the terminal device, and the timer is used to instruct the terminal device whether to send data on a non-scheduling resource. Therefore, a data sending success rate and a communication latency of the terminal device can be effectively balanced, the UE can be prevented from frequently performing non-scheduling sending, and usage efficiency of the non-scheduling resource can be also ensured.

Optionally, in an embodiment of this application, the grant resource indicated by the grant resource indication information is a resource that is requested by the terminal device for sending uplink data.

Specifically, the grant resource indication information may be carried on a downlink control channel (PDCCH), and may be, for example, downlink control information (DCI) on the PDCCH.

Optionally, in an embodiment of this application, the method further includes: receiving, by the terminal device, a non-scheduling resource indication sent by the network device; and determining, according to the non-scheduling resource indication, that the terminal device sends uplink data by using the non-scheduling resource, and stopping the first timer.

In other words, when the terminal device receives the non-scheduling resource indication sent by the network device, the terminal device learns, according to the non-scheduling resource indication, that the terminal device can continue to use the non-scheduling resource to send uplink data. In this case, the first timer may be stopped, and the non-scheduling resource is used again to send uplink data.

Specifically, the non-scheduling resource indication may be DCI. For example, the DCI includes one instruction bit, used to instruct to stop the first timer. This is not limited in this application.

Optionally, the UE transfers data from an originally non-scheduling HARQ process to a scheduling HARQ process for sending.

The network may configure a quantity (N≥1) of processes used by the UE for non-scheduling sending, and a quantity of processes used for scheduling sending is (M−N). M is a maximum quantity of processes.

If the UE does not receive an acknowledgement (ACK) but receives a scheduling grant for retransmission after sending data through non-scheduling, the UE transfers the data from an original HARQ process to a scheduled HARQ process for retransmission. For example, to-be-sent data is generated by using an indicated redundancy version. If the received scheduling grant is used for initial transmission, the data is transferred, according to an instruction of the network, from the original HARQ process to the scheduled HARQ process, and sent in an initial transmission manner.

The UE retransmits or initially transmits a packet that is generated N duration ago. The N indicates a duration N before a moment at which the grant is received. A value of N may be dynamically indicated by a scheduling indication. If the duration N is not indicated, the UE retransmits or initially transmits, by default, a data packet for which no ACK is received and that is sent for the last time in a HARQ process for non-scheduling sending or all data packets for which no ACK is received and that are sent through non-scheduling.

If the UE has only one HARQ process for non-scheduling sending, the UE retransmits or initially transmits, by default, a data packet for which no ACK is received and that is sent for the last time in the HARQ process for non-scheduling sending.

If the UE has a plurality of HARQ processes for non-scheduling sending, and there are a plurality of packets that are sent through non-scheduling and for which no ACK is received, the UE sequentially transfers, in a previous sending order to a HARQ process indicated by a scheduling indication, the packets that are in a non-scheduling HARQ buffer and for which no ACK is received, for sending. According to this embodiment, a network side and the UE have a uniform recognition for a scheduling retransmission packet and a non-scheduling sending packet to facilitate HARQ soft combination, and a risk of incorrect combination of a scheduling retransmission packet and an initial transmission packet can be solved. If a manner that an initial transmission is used for a non-scheduling data packet, it is easy, but the data packet cannot be combined with a packet sent previously through non-scheduling.

Optionally, in another embodiment of this application, when the first timer expires or a condition for starting the first timer is not met, the UE sends data by using the non-scheduling resource.

The UE generates a MAC protocol data unit (PDU) data packet or delivers a MAC PDU data packet to a physical layer in N subframes, slots, or symbols before a sending moment by using a grant-free (GF)non-scheduling resource. A value ofN may be specified in a protocol or configured by the network for the UE. Specifically, logical channel prioritization, including placing the generated MAC PDU data packet into an available HARQ process, is completed.

The network optionally configures a quantity (N≥1) of processes used by the UE for non-scheduling sending, and a quantity (M−N) of processes used for scheduling sending. M is a maximum quantity of processes supported by the UE.

Therefore, in this embodiment of this application, during switching from a non-scheduling mode to a scheduling mode, the network device and the terminal device have a uniform data sending manner, to facilitate HARQ combination for the network device, thereby obtaining a HARQ combination gain.

Figure 5:
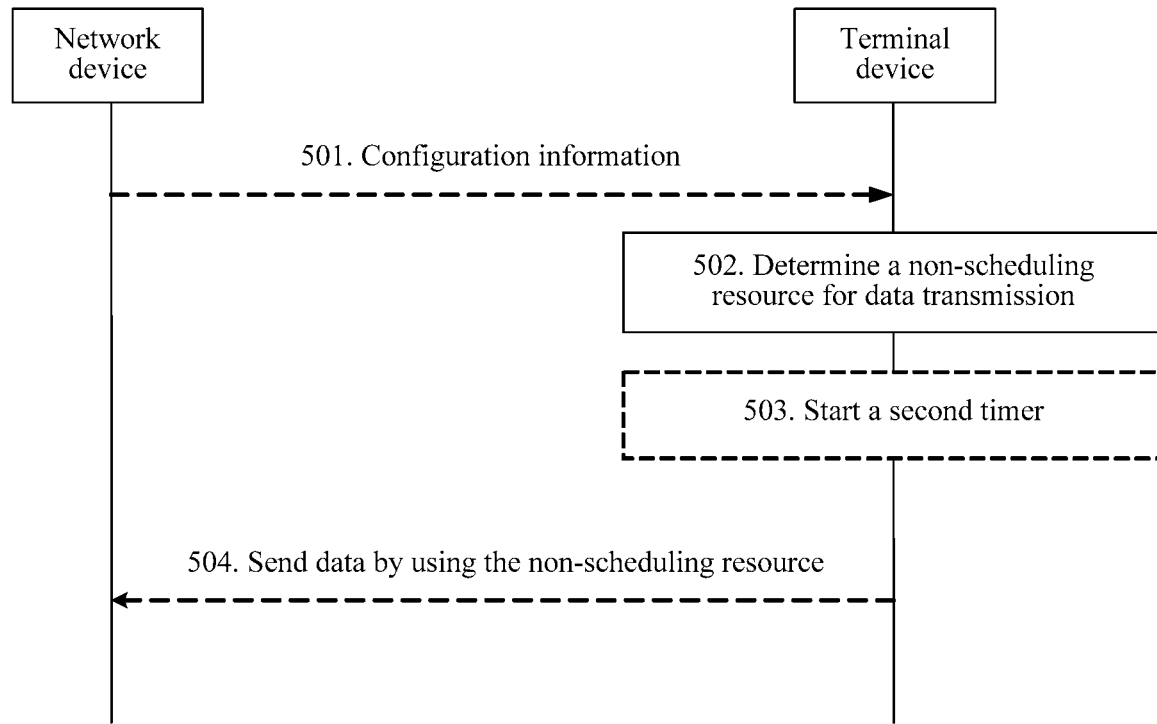
FIG. 5 is a schematic flowchart of a method according to an embodiment of this application.

FIG. 5 is a schematic flowchart of a method according to an embodiment of this application. It should be noted that, dashed lines in FIG. 5 indicate that corresponding steps are optional steps. It should be understood that, these steps or operations are merely examples. Other operations or variants of operations in FIG. 5 may alternatively be performed in this embodiment of this application. In addition, the steps in FIG. 5 may be performed in an order different from that presented in FIG. 5, and the operations in FIG. 5 may not necessarily be all performed. As shown in FIG. 5, the method includes the following steps.

Optionally: Step 501. A network device sends configuration information to a terminal device, where the configuration information is used to schedule a non-scheduling resource.

It should be understood that, a definition of the configuration information is the same as a definition in the embodiment in FIG. 4. For brevity, details are not repeated here.

Step 502. The terminal device receives the configuration information sent by the network device, and determines a non-scheduling resource for data transmission based on the configuration information.

Step 503. The terminal device starts a second timer, where the non-scheduling resource is not used for sending data within duration of usage of the second timer, when any one of the following conditions is met: a volume of first to-be-sent data of the terminal device is less than a first threshold; a priority of a service of the first to-be-sent data is lower than a preset priority; and a logical channel on which the first to-be-sent data is located in a preset logical channel set.

Specifically, the first threshold may be a threshold preset by a network, and may be, for example, 200 bits. When the first to-be-sent data is greater than or equal to the threshold, the second timer is not started.

Specifically, each type of data corresponds to one type of service, and different services may have respective priorities. For example, a priority of a URLLC (ultra-reliable low latency communication) service is higher than a priority of an enhanced mobile broadband (eMBB) service. If a priority is mapped to each service, and a preset priority is set, in other words, a threshold priority is set, when the priority of the service is higher than or equal to the preset priority, the second timer is not started, and when the priority of the service is lower than the preset priority, the second timer is started.

Specifically, when the logical channel on which the first to-be-sent data is located is in the preset logical channel set, the second timer is started. If the logical channel on which the first to-be-sent data is located is not in the preset logical channel set, the second timer is not started.

Logical channels are defined for transmission of different types of data services at a MAC layer, and include a control channel and a service channel. For example, the logical channel set may be some control channels or some service channels.

Step 504. When the second timer expires, the terminal device sends the first to-be-sent data by using the non-scheduling resource.

It should be understood that, in the embodiment shown in FIG. 5, the duration of the second timer may be set to a heartbeat handshake period of instant messaging software, for example, 200 ms. This is not limited in this application.

It should be understood that, some logical channels or radio bearers may be set to ignore the first timer through pre-configuration. Alternatively, the first timer may be configured for one or more logical channels. For example, the first timer may be separately configured for a DRB or an SRB.

According to the method provided in this embodiment of this application, a timer is set on the terminal device, and the timer is used to instruct the terminal device whether to send data on a non-scheduling resource. Therefore, a data sending success rate and a communication latency of the terminal device can be effectively balanced, and a UE can be prevented from frequently performing non-scheduling sending, thereby reducing a conflict opportunity.

Optionally, in an embodiment of this application, when the data volume of the first to-be-sent data is less than the first threshold, the first to-be-sent data is sent by using the non-scheduling resource, or the first to-be-sent data is sent by using a 2-step random access channel (RACH); otherwise, the first to-be-sent data is sent by using a 4-step RACH. The 2-step RACH means that both the first to-be-sent data and a preamble sequence are sent in a first message, and the UE receives a random access acknowledge response for the preamble or an acknowledge response for the first to-be-sent data. The 4-step RACH means that the UE sends a preamble sequence, receives a random access response, sends the first to-be-sent data by using a resource in the access response, and receives an acknowledge response for the first to-be-sent data to complete a contention resolution.

Optionally, in an embodiment of this application, the method further includes: stopping, by the terminal device, the second timer when the second timer has not expired and a volume of second to-be-sent data of the terminal device exceeds a second threshold; and sending, by the terminal device, the second to-be-sent data by using the non-scheduling resource.

In other words, after the second timer expires, the non-scheduling resource may be used to send the first to-be-sent data. In this way, a UE can be prevented from frequently occupying a shared non-scheduling resource, and a plurality of small packets can be aggregated for sending at a time, thereby improving resource usage efficiency.

Figure 6:
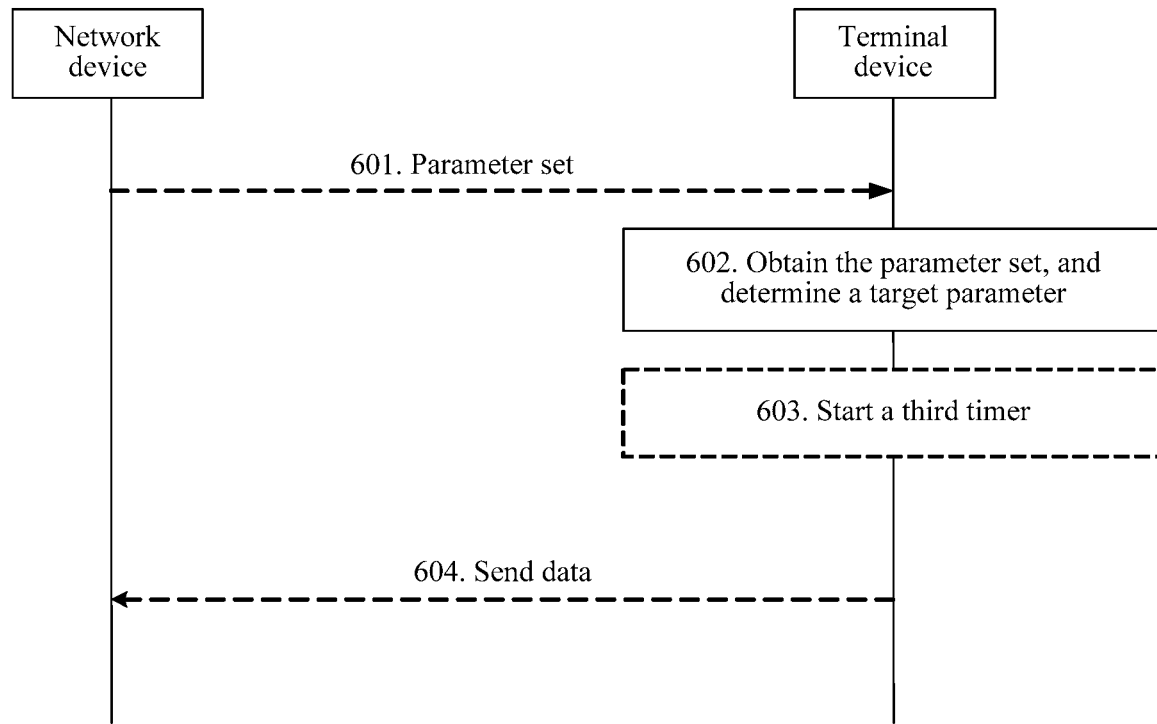
FIG. 6 is a schematic flowchart of a method according to an embodiment of this application.

FIG. 6 is a schematic flowchart of a method according to an embodiment of this application. It should be noted that, dashed lines in FIG. 6 indicate that corresponding steps are optional steps. It should be understood that, these steps or operations are merely examples. Other operations or variants of operations in FIG. 6 may alternatively be performed in this embodiment of this application. In addition, the steps in FIG. 6 may be performed in an order different from that presented in FIG. 6, and the operations in FIG. 6 may not necessarily be all performed. As shown in FIG. 6, the method includes the following steps.

Optionally: Step 601. A network device sends a parameter set to a terminal device.

Specifically, the network device may specify the parameter set by using a dedicated or common system message, or by using a protocol.

Specifically, the network device configures a corresponding parameter set for each service or a logical channel carried by each service.

Specifically, Table 1 is a schematic table of the parameter set.

TABLE 1

|  | Emergency call | URLLC | MBB | MTC |
|---|---|---|---|---|
| Grant Free | (1, — ) | (0.8, 2) | (0.5, 20) | (0.3, 20) |
| 2-step RACH | (1, — ) | (0.8, —) | (0.5, 20) | (0.4, 20) |
| 4-step RACH | (1, — ) | (0.8, — ) | (0.8, 20) | (0.9, 20) |

Table 1 shows parameters corresponding to four services in cases of non-scheduling sending (e.g., Grant Free), a 2-step RACH, and a 4-step RACH. Specifically, the parameter is expressed in a form of (a, b), and may alternatively be understood as a congestion control factor, where a is a positive number less than or equal to 1 and indicates that a third timer is started with a probability of 1-a, and b indicates duration of the third timer, with a unit of ms.

Service features of machine type communication (MTC) are: a small data sending volume, a long sending interval, and a low latency requirement.

Step 602. The terminal device obtains the parameter set.

It should be understood that, the terminal device may obtain the parameter set by receiving the parameter set sent by the network device, or the parameter set may be a preset parameter set in the terminal device. This is not limited in this application.

Further, in step 602, the terminal device determines a target parameter in the parameter set based on at least one of a service and a sending mode of to-be-sent data.

It should be understood that, the data may be sent by using the 2-step RACH or the 4-step RACH, or in another manner. This is not limited in this application.

In other words, as shown in Table 1, when it is determined that the to-be-sent data of the terminal device is an MBB service, and random access is performed by using the 2-step RACH, a corresponding parameter is (0.5, 20). In other words, there is a probability of 0.5 that the third timer is started, and the duration of the third timer is 20 ms.

It should be understood that, the parameter set may be determined based on only a service type or a quality of service (QoS) parameter of a service, or may be determined based on only a sending mode, or may be determined based on both a service and a sending mode. This is not limited in this application.

Step 603. The terminal device starts a third timer based on the target parameter, a non-scheduling resource is not used for sending the to-be-sent data within of the third timer.

Optionally, in an embodiment of this application, a higher priority of the service type of the to-be-sent data indicates a larger parameter and a lower probability that the third timer is started.

Optionally, in step 604, when the third timer is not started, uplink data is sent by using the non-scheduling resource or a scheduling resource.

It should be understood that, after the third timer expires, if the terminal device still needs to send data, the terminal device still needs to determine a target parameter based on the parameter set, to determine whether to restart the third timer or send data.

According to the method provided in this embodiment of this application, a timer is set on the terminal device, and the timer is used to instruct the terminal device whether to send data on a non-scheduling resource. Therefore, a data sending success rate and a communication latency of the terminal device can be effectively balanced, and a probability that a high-priority service is sent through non-scheduling is increased.

Figure 7:
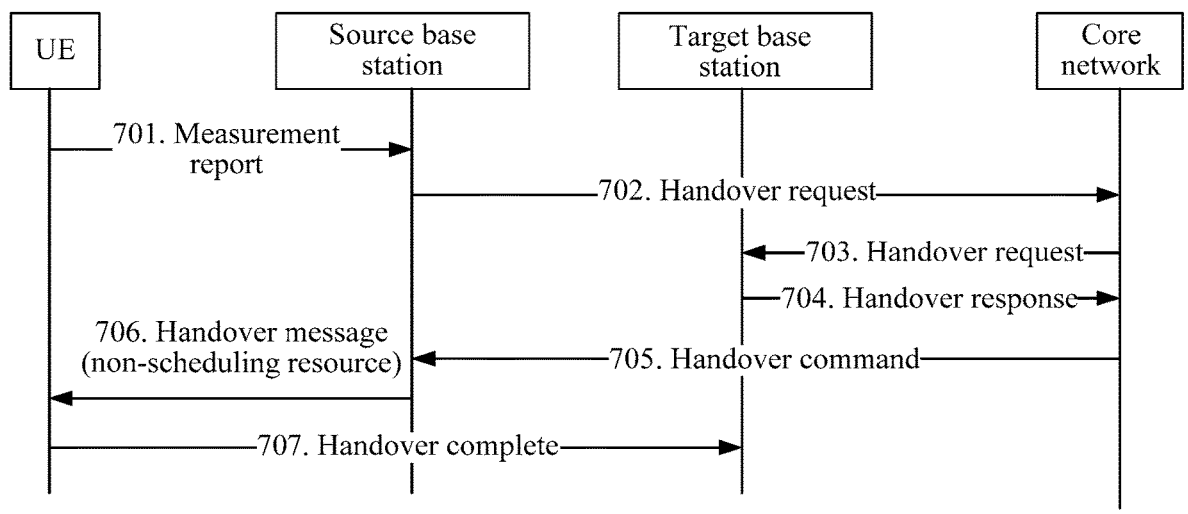
FIG. 7 is a schematic flowchart of a method according to an embodiment of this application.

FIG. 7 is a schematic flowchart of a method according to an embodiment of this application. In this embodiment of this application, a terminal device is handed over from a cell of a source base station to a cell of a target base station.

Optionally: Step 701: The terminal device sends a measurement report to the source base station, where the measurement report is used to determine a target cell to which the UE is to be handed over, and the target cell belongs to the target base station.

Step 702. The source base station sends a handover request to a core network, where the handover request is used by the source base station to request the core network to initiate handover to the target base station.

Step 703. The core network sends a handover request to the target base station, where the handover request is used by the core network to request the target base station to determine whether to allow the UE to be handed over to the target cell.

Step 704. The target base station sends a handover response to the core network, where the handover response includes at least a non-scheduling resource allocated by the target base station to the UE and the target cell to be handed over to.

Step 705. The core network sends a handover command to the source base station, and allocates, in the handover command to the UE, a non-scheduling resource for directly sending uplink data and information about the target cell, where the handover command includes resource configuration information, and the resource configuration information includes at least one of the following information: a cyclic prefix (CP) length of the non-scheduling resource, a subcarrier spacing of the non-scheduling resource, a transmission time interval (TTI) of the non-scheduling resource, a periodic usage period of the non-scheduling resource, a time-frequency resource block identifier of the non-scheduling resource, timing advance indication information, duration in which use of the resource is allowed, and a waveform type indication. It should be understood that, the non-scheduling resource is preferably UE-specific. The waveform type indicated by the waveform type indication information includes at least one of discrete Fourier transform-spread orthogonal frequency division multiple access (DFT-s-OFDM) and cyclic prefix orthogonal frequency division multiple access (CP-OFDM).

After receiving the handover command sent by the network device, the non-scheduling resource indicated by the handover command is used by the UE to send uplink data to the target cell. So the UE can directly send uplink data on the non-scheduling resource, without performing 4-step random access to request the network device to allocate a scheduling resource to the UE. It should be understood that, the data may include user plane data or control signaling.

Optionally, after receiving the handover command, the UE starts a timer. Duration of the timer is optionally received in the handover command or configured by default. When the timer expires or an instruction of the target cell is received, the timer is stopped or the non-scheduling resource is released.

It should be understood that, the received instruction of the target cell may be physical layer or higher layer instruction information. For example, scheduling signaling of the UE is received.

It should be understood that, if the network supports handover between base stations, the target base station may directly allocate a non-scheduling resource after receiving the handover request of the source base station, and send the non-scheduling resource by using a handover response to the source base station.

For example, the non-scheduling resource can carry a data sharing channel.

Figure 8:
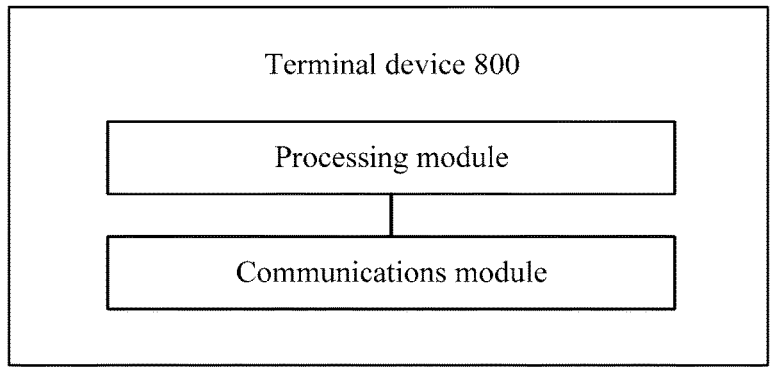
FIG. 8 is a schematic block diagram of a terminal device according to an embodiment of this application.

Therefore, in a handover process, the target cell allocates the non-scheduling resource to the UE to implement rapid handover of the UE. The UE can send data to the target cell by using the non-scheduling resource. Therefore, a latency in handover of the UE between cells can be reduced, and usage duration of the non-scheduling resource can be flexibly managed. FIG. 8 is a schematic block diagram of a terminal device 800 according to an embodiment of this application. Modules in the terminal device 800 are configured to perform respective actions or processing processes performed by the terminal device in the foregoing method. Herein, to avoid repetition, for detailed descriptions, refer to the descriptions provided above.

The terminal device may include a communications module and a processing module. The communications module is configured to receive configuration information sent by a network device. The configuration information is used to configure a non-scheduling resource. The processing module is configured to start a first timer, where the non-scheduling resource is not used for sending uplink data within duration of the first timer, when any one of the following conditions is met: the terminal device sends uplink data on the non-scheduling resource; the terminal device receives grant resource indication information sent by the network device; the terminal device receives grant resource indication information sent by the network device, and sends uplink data on a grant resource indicated by the grant resource indication information; the terminal device receives a dedicated preamble sequence index sent by the network device; the terminal device receives a dedicated preamble sequence index sent by the network device, and sends a dedicated preamble sequence to the network device based on the preamble sequence index; and the terminal device requests a grant resource from the network device.

Optionally, in an embodiment of this application, the communications module is configured to send a buffer state report (BSR) to the network device; or send a BSR to the network device, and receive a correct-receive response of the BSR.

Optionally, in an embodiment of this application, the grant resource indicated by the grant resource indication information is a resource that is requested by the terminal device for sending uplink data.

Optionally, in an embodiment of this application, the communications module is further configured to receive a non-scheduling resource indication sent by the network device, and the processing module is further configured to determine, according to the non-scheduling resource indication, that the terminal device sends uplink data by using the non-scheduling resource, and stop the first timer.

Optionally, the terminal device 800 includes a communications module and a processing module. The communications module is configured to receive configuration information sent by a network device. The configuration information is used to configure a non-scheduling resource. The processing module is configured to start a second timer, where the non-scheduling resource is not used for sending uplink data within duration of the second timer, when any one of the following conditions is met: a volume of first to-be-sent data of the terminal device is less than a first threshold; a priority of a service of the first to-be-sent data is lower than a preset priority; and a logical channel on which the first to-be-sent data is located is a channel in a preset logical channel set.

Optionally, the processing module is configured to stop the second timer when the second timer has not expired and a volume of second to-be-sent data of the terminal device exceeds a second threshold; and send, by the terminal device, the second to-be-sent data by using the non-scheduling resource; or send, by the terminal device when the second timer expires, the first to-be-sent data by using the non-scheduling resource.

Optionally, the terminal device 800 includes a processing module and a communications module. The communications module is configured to obtain a parameter set. The processing module determines a target parameter in the parameter set based on at least one of a service type and a sending mode of to-be-sent data. The processing module is further configured to start a third timer based on the target parameter, where a non-scheduling resource is not used for sending the to-be-sent data within duration of the third timer.

Optionally, in an embodiment of this application, a higher priority of the service type of the to-be-sent data indicates a larger parameter and a lower probability that the third timer is started.

It should be noted that, the processing module in this embodiment may be implemented by processor 301 in FIG. 3, and the communications module in this embodiment may be implemented by the receiver 302 and the transmitter 303 in FIG. 3.

For a technical effect that can be achieved by this embodiment, refer to the descriptions provided above. Details are not repeated here.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit described above, refer to a corresponding process in the foregoing method embodiments, and details are not repeated here.

With respect to the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve objectives of solutions of embodiments.

In addition, function units in embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, technical solutions of this application may be implemented in a form of a software product. The computer software product is stored in a storage medium, and includes several instructions for instructing a computer device (which may be a personal computer, a server, or a network device) to perform all or some of the steps of methods described in embodiments of this application. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing descriptions are merely exemplary implementations of this application, but are not intended to limit the protection scope of this application. Any variation or replacement readily figured out by a person skilled in the art within the technical scope disclosed in this application may fall within the protection scope of this application.

What is claimed is:

1. A data sending method implemented in a terminal device, comprising:
   receiving configuration information for configuring a non-scheduling resource, wherein the non-scheduling resource is a periodic resource allocated by a network device for data transmission;
   determining, based on the configuration information, the non-scheduling resource;
   receiving a first indication indicating a grant resource requested by the terminal device; and
   in response to receiving the first indication, starting a first timer;
   wherein during running of the first timer, the terminal device is configured with the non-scheduling resource and the grant resource; and
   wherein during running of the first timer, the terminal device uses, out of the non-scheduling resource and the grant resource, the grant resource to send uplink data, and after the first timer expires, the terminal device uses the non-scheduling resource to send uplink data.

2. The method according to claim 1, wherein the method further comprises:
   receiving a second indication, wherein the second indication indicates that the terminal device can use the non-scheduling resource to send uplink data; and
   determining, according to the second indication, that the non-scheduling resource can be used to send uplink data, and stopping the first timer.

3. The method according to claim 2, wherein the second indication is downlink control information (DCI).

4. The method according to claim 1, wherein the configuration information comprises at least one of the following:
   a usage periodicity of the non-scheduling resource,
   a modulation and coding scheme,
   a quantity of continuous and repeated usage times within one period,
   a retransmission redundancy version,
   a radio network temporary identifier (RNTI) for allocating the non-scheduling resource, or
   hybrid automatic repeat request (HARQ) information, wherein the HARQ information comprises a quantity of HARQ processes.

5. The method according to claim 1, wherein the method further comprises:
   receiving a third indication, wherein the duration of the first timer is indicated by the third indication.

6. The method according to claim 1, wherein starting the first timer is further in response to uplink data being sent on the grant resource indicated by the first indication.

7. A communication device, comprising:
   at least one processor; and
   a memory coupled to the at least one processor, wherein the memory has processor-executable instructions stored thereon;
   wherein the at least one processor is configured to execute the processor-executable instructions to facilitate the following being performed by the communication device:
   receiving configuration information for configuring a non-scheduling resource, wherein the non-scheduling resource is a periodic resource allocated by a network device for data transmission;
   determining, based on the configuration information, the non-scheduling resource;
   receiving a first indication indicating a grant resource requested by the communication device; and
   in response to receiving the first indication, starting a first timer; wherein during running of the first timer, the communication device is configured with the non-scheduling resource and the grant resource; and
   wherein during running of the first timer, the communication device uses, out of the non-scheduling resource and the grant resource, the grant resource to send uplink data, and after the first timer expires, the communication device uses the non-scheduling resource to send uplink data.

8. The communication device according to claim 7, wherein the at least one processor is further configured to execute the processor-executable instructions to facilitate the following being performed by the communication device:
receiving a second indication, wherein the second indication indicates that the communication device can use the non-scheduling resource to send uplink data;
determining, according to the second indication, that the non-scheduling resource can be used to send uplink data; and
stopping the first timer.

9. The communication device according to claim 8, wherein the second indication is downlink control information (DCI).

10. The communication device according to claim 7, wherein the configuration information comprises at least one of the following:
a usage periodicity of the non-scheduling resource,
a modulation and coding scheme,
a quantity of continuous and repeated usage times within one period,
a retransmission redundancy version,
hybrid automatic repeat request (HARQ) information, wherein the HARQ information comprises a quantity of HARQ processes, or
a radio network temporary identifier (RNTI) for allocating the non-scheduling resource.

11. The communication device according to claim 7, wherein the at least one processor is further configured to execute the processor-executable instructions to facilitate the following being performed by the communication device:
receiving a third indication, wherein the duration of the first timer is indicated by the third indication.

12. The communication device according to claim 7, wherein starting the first timer is further in response to uplink data being sent on the grant resource indicated by the first indication.

13. A data sending method implemented in a network device, comprising:
sending configuration information for configuring a non-scheduling resource, wherein the non-scheduling resource is a periodic resource allocated by the network device for data transmission; and
sending a first indication indicating a grant resource requested by a terminal device, wherein the first indication is to be used to start a first timer; wherein during running of the first timer, the terminal device is configured with the non-scheduling resource and the grant resource; and wherein during running of the first timer, the network device uses, out of the non-scheduling resource and the grant resource, the grant resource to receive uplink data, and after the first timer expires, the network device uses the non-scheduling resource to receive uplink data.

14. The method according to claim 13, wherein the method further comprises:
sending a second indication, wherein the second indication indicates that the first timer can be stopped and the non-scheduling resource can be used to send uplink data.

15. The method according to claim 14, wherein the second indication is downlink control information (DCI).

16. The method according to claim 13, wherein the configuration information comprises at least one of the following:
a usage periodicity of the non-scheduling resource,
a modulation and coding scheme,
a quantity of continuous and repeated usage times within one period,
a retransmission redundancy version,
hybrid automatic repeat request (HARQ) information, wherein the HARQ information comprises a quantity of HARQ processes, or
a radio network temporary identifier (RNTI) for allocating the non-scheduling resource.

17. The method according to claim 13, wherein the method further comprises:
sending a third indication, wherein the duration of the first timer is indicated by the third indication.

18. The method according to claim 13, wherein starting the first timer is in response to uplink data being sent on the grant resource indicated by the first indication.

19. A communication device, comprising:
at least one processor; and
a memory coupled to the at least one processor, wherein the memory has processor-executable instructions stored thereon;
wherein the at least one processor is configured to execute the processor-executable instructions to facilitate the following being performed by the communication device:
sending configuration information for configuring a non-scheduling resource, wherein the non-scheduling resource is a periodic resource allocated by the communication device for data transmission; and
sending a first indication indicating a grant resource requested by a terminal device, wherein the first indication is to be used to start a first timer; wherein during running of the first timer, the terminal device is configured with the non-scheduling resource and the grant resource; and wherein during running of the first timer, the communication device uses, out of the non-scheduling resource and the grant resource, the grant resource to receive uplink data, and after the first timer expires, the communication device uses the non-scheduling resource to receive uplink data.

20. The communication device according to claim 19, wherein starting the first timer is in response to uplink data being sent on the grant resource indicated by the first indication.

21. The communication device according to claim 19, wherein the at least one processor is further configured to execute the processor-executable instructions to facilitate the following being performed by the communication device:
sending a second resource indication, wherein the second indication indicates that the first timer can be stopped and the non-scheduling resource can be used to send uplink data.

22. The communication device according to claim 19, wherein the configuration information comprises at least one of the following:
a usage periodicity of the non-scheduling resource,
a modulation and coding scheme,
a quantity of continuous and repeated usage times within one period,
a retransmission redundancy version,
a radio network temporary identifier (RNTI) for allocating the non-scheduling resource, or hybrid automatic repeat request (HARQ) information, wherein the HARQ information comprises a quantity of HARQ processes.

\* \* \* \* \*